(12) United States Patent
Seidler

(10) Patent No.: US 7,853,300 B2
(45) Date of Patent: Dec. 14, 2010

(54) SLIDING MECHANISM WITH SPRING POSITIONING

(75) Inventor: Jack Seidler, Flushing, NY (US)

(73) Assignee: Interplex Nas, Inc., College Point, NY (US)

( * ) Notice: Subject to any disclaimer, the term of this patent is extended or adjusted under 35 U.S.C. 154(b) by 873 days.

(21) Appl. No.: 11/750,765

(22) Filed: May 18, 2007

(65) Prior Publication Data
US 2007/0284917 A1 Dec. 13, 2007

Related U.S. Application Data

(60) Provisional application No. 60/801,647, filed on May 18, 2006.

(51) Int. Cl.
*H04M 1/00* (2006.01)
(52) U.S. Cl. .............. 455/575.4; 455/575.3; 455/575.2; 455/575.1; 455/550.1; 379/433.11; 379/433.13
(58) Field of Classification Search ... 455/575.1–575.4, 455/550.1, 90.3; 345/905; 379/330, 428.01, 379/433.11–433.13, 447
See application file for complete search history.

(56) References Cited

U.S. PATENT DOCUMENTS

| | | | | |
|---|---|---|---|---|
| 7,084,345 B1 * | 8/2006 | Chen et al. | ................... | 174/545 |
| 7,162,283 B2 * | 1/2007 | Bae et al. | ................. | 455/575.4 |
| 2005/0250563 A1 * | 11/2005 | Nan | ........................ | 455/575.4 |
| 2007/0155447 A1 * | 7/2007 | Gordecki | ................. | 455/575.4 |

* cited by examiner

*Primary Examiner*—Nick Corsaro
*Assistant Examiner*—Sarwat Chughtai
(74) *Attorney, Agent, or Firm*—Weingarten, Schurgin, Gagnebin & Lebovici LLP

(57) ABSTRACT

A sliding mechanism includes two members, one of which is slidable with respect to the other along an axis. One of the members slides back and forth with respect to the other between a first position and a second position. A leaf spring is used as a positioning element to hold one of the members in either the first position or the second position. The leaf spring is attached to one of the two members and the other of the two members includes a projection. The leaf spring abuts the projection holding the slidable member in either the first position or the second position. When a user pushes one of the members from one position to another, the projection pushes the leaf spring out of the way until it passes an apex of the leaf spring and is held in the other position.

18 Claims, 2 Drawing Sheets

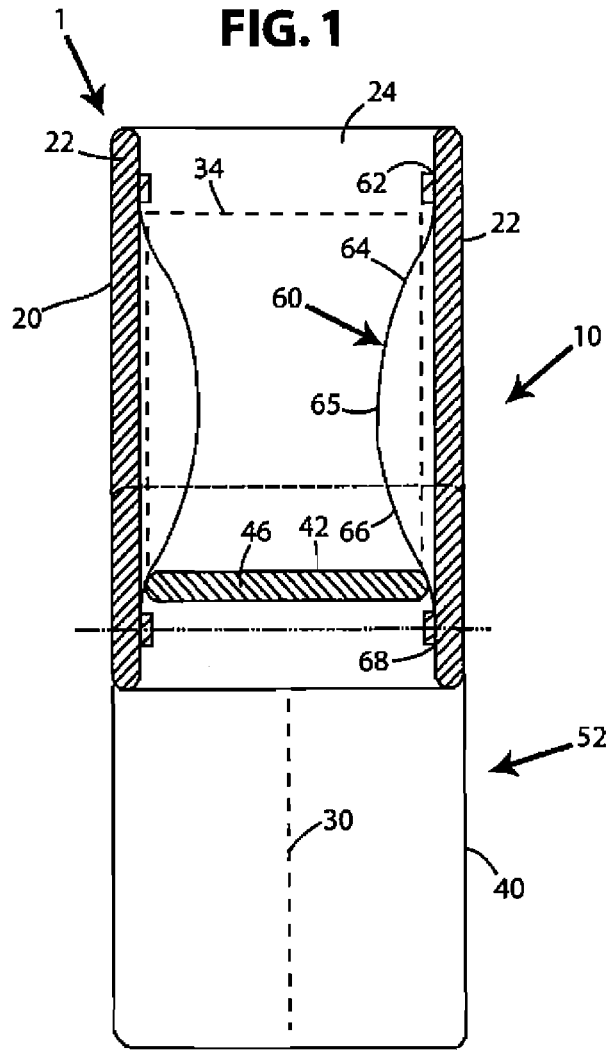
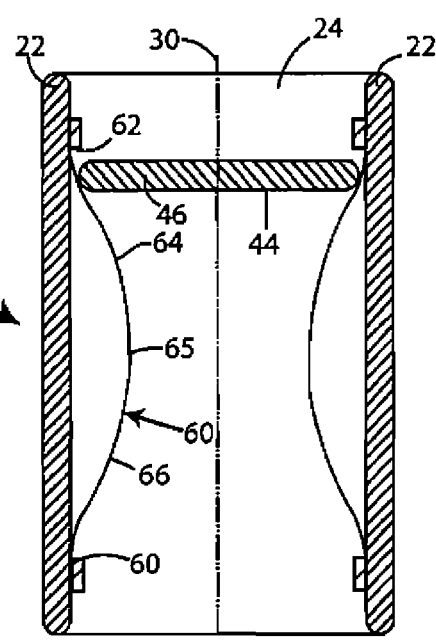

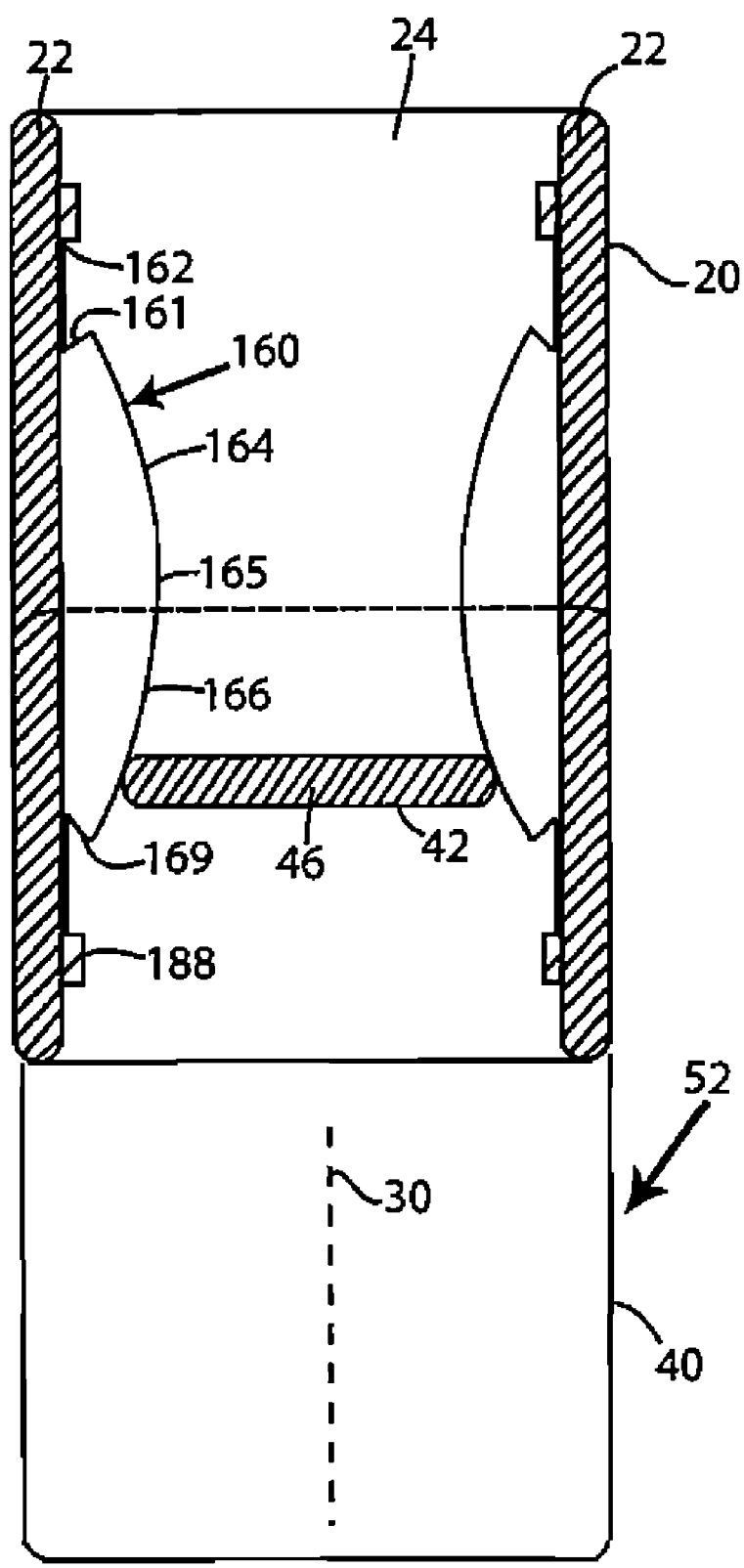

SLIDING MECHANISM WITH SPRING POSITIONING

CROSS-REFERENCE TO RELATED APPLICATIONS

The benefit of priority to U.S. Provisional Patent Application No. 60/801,647 filed on May 18, 2006 is claimed.

STATEMENT REGARDING FEDERALLY SPONSORED RESEARCH

Not Applicable

THE NAMES OF THE PARTIES OF A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to positioning mechanisms for sliding devices and, more specifically, relates to positioning mechanisms using a spring.

2. Description of Related Art

The use of devices which have two connected parts that slide relative to one another has become increasingly popular in the portable electronics industry. Typically, a top member slides over a bottom member in moving between an open position and a closed position. In the closed position a first surface on the front of the top member is viewable but a second surface on the front of the bottom surface is concealed. When opened, the top member slides away, exposing, the second surface of the bottom member. This arrangement has several advantageous characteristics. First, the second surface increases the viewable and usable surface area of the device. Second, the device can be placed in the closed position to make it more compact. Finally, the second surface is protected when in the closed position, allowing sensitive components to be placed thereon without the risk that they will be affected when the device is closed.

Commonly, sliding electronic devices include a screen on the first surface and a keypad on the second surface. The screen is always exposed and viewable such that it may be read without opening the device. On the other hand, the keypad is only exposed when the device is opened. Thus, the keypad is protected when the device is not being used.

It is usually desirable to have sliding devices of this kind be fixed in the open position or in the closed position. It is undesirable for the user to be required to hold the device in the open position while using both the first and second surface. Likewise, when the device is stored away it is advantageous for the device to remain in the closed position.

Accordingly, most sliding devices have a locking mechanism that holds the sliding device in one of the open position and the closed position, but is weak enough that the user can easily change the position of the device by applying a slight pressure. Known locking mechanisms include systems having a ball, groove and two catches. The ball is held in place with respect to one of the top or bottom member, and the other member includes the groove with the catches at either end of the groove. If the device is closed the ball rests in one catch. When the user pushes the top member over the bottom member, the ball is dislodged from the catch and rolls along the groove until it lodges into the other catch. A similar design includes spring loaded protrusions on one of the members at both ends of a groove or path. A wedge on the other member is disposed in the path such that it sits behind the protrusion when in either the open or closed position. When the user pushes the slide, the wedge forces the protrusion back and slides along the path until it becomes fixed behind the protrusion at the other end of the path. Both of these mechanisms operate adequately, however, they include a number of small precision parts.

Another known locking mechanism includes magnets that hold the sliding members at either end. This mechanism is effective, but can interfere with the electronics of the device and thus, requires shielding.

Another drawback of these locking mechanisms is that they all require the user to operate the sliding device until it has locked in one of the open or closed positions. If the user slides the members almost all the way to the locked position, but does not lock the device, there is a risk that the device will slide back to the previous position. Thus, there is a need for a simple, low-cost mechanism that will hold a sliding device in two positions.

BRIEF SUMMARY OF THE INVENTION

The present invention is for a positioning mechanism for a sliding device that includes a leaf spring to hold the device in one of a first position and a second position. The sliding device includes a top member and a bottom member. The top and bottom members are slidably engaged and provided with a guide mechanism to limit the direction one member may slide with respect to the other. The guide mechanism may be a rail system, a tongue and groove device, or any other device known in the art for allowing two members to freely slide along a sliding axis but remain relatively fixed in the axes that are orthogonal to the sliding axis.

The positioning mechanism holds the two members in either the first position or the second position. The positioning member includes a leaf spring that is attached to one of the two sliding members. The leaf spring may be attached at a single point or at two or more points. Each attachment may be fixed or may be slidable. Thus, the leaf spring may have one or more attachments points any or none of which may be slidable. In the case of two attachment points, the attachment ends are located at different points along the sliding axis. The leaf spring includes an apex that projects along an axis that is orthogonal to the sliding axis. When in a relaxed position, the apex of the leaf spring rests at a first point along the orthogonal axis. The other sliding member includes a projection that moves in the sliding direction through a space adjacent to the leaf spring. The projection is oriented along the orthogonal axis and positioned closer to the attachment ends of the leaf spring than the apex of the leaf spring. Thus, when the sliding device is in the first position, the apex of the leaf spring projects beyond an end of the projection along the orthogonal axis. A curved side of the leaf spring pushes against the projection holding the two sliding members in the first position.

When the user wants to place the device in the second position he or she pushes one member along the sliding axis. As the top and bottom members are relocated, the projection pushes against the curved edge of the leaf spring. The leaf spring deforms as the projection moves and the sliding members are relocated from the first position to the second position. Once the projection is pushed beyond the apex of the leaf spring, the user may stop pushing on the members of the sliding device. Beyond the apex, the leaf spring pushes the projection such that the sliding members are relocated to the second position. Thus, the leaf spring and projection hold the sliding members in the first or second position.

BRIEF DESCRIPTION OF THE SEVERAL
VIEWS OF THE DRAWINGS

These and other objects and features of the invention will become more apparent by referring to the drawings, in which:

FIG. 1 is a top sectional view of a sliding device in an open position in accordance with one embodiment of the present invention;

FIG. 2 is a top sectional view of the sliding device of FIG. 1 in a closed position; and FIG. 3 is a top sectional view of a sliding device in an open position in accordance with another embodiment of the present invention.

DETAILED DESCRIPTION OF THE INVENTION

One embodiment of the sliding position mechanism according to the present invention is shown in FIGS. 1 and 2. The sliding position mechanism 10 is part of sliding device 1 which includes a top member 20 and a bottom member 40. The top member 20 and bottom member 40 are slidably attached and may slide along a sliding axis 30. In the description provided, the top member 20 is described as stationary and only the bottom member 40 slides. However, it is to be understood that the bottom member 40 may be held stationary and the top member 20 moved. The sliding device has two rest positions. In the illustrated embodiment, the rest positions are shown as an open position 52, as shown in FIG. 1, and a closed position 54, as shown in FIG. 2. In the open rest position 52 shown in FIG. 1, the top member 20 is displaced from bottom member 40 and only a section of bottom member 40 is obscured. In contrast, in the closed rest position 54 shown in FIG. 2, the top member 20 overlaps with the bottom member 40 and obscures all or most of bottom member 40. The bottom member 40 may slide from the closed rest position 54 through a range of intermediate positions to an open rest position 52. Movement of the slide device 1 may be limited using stops, such that the bottom member 40 cannot slide beyond either rest position 52, 54. The slide device 1 may also be limited such that the bottom member 40 can only move with respect to the top member 20 along the sliding axis 30. Translational motion may be prohibited along the other two axes and all rotational motion may be prohibited. The slide device 1 may include a guide mechanism (not shown) for limiting the sliding distance of the top 20 and bottom member 40 and preventing movement other than along the sliding axis 30. The guide mechanism may be a guide rail or tongue and groove device, or other types of guides.

The top member 20 has two sidewalls 22 and a channel 24 therebetween. The bottom member 40 has a projection 46 that sits within channel 24. Projection 46 may pass from a first position 42 when bottom member 40 is in the open rest position 52, through a path 34, to a second position 44 when bottom member 40 is in the closed rest position 54. Each sidewall 22 has a leaf spring 60 attached thereto and projecting into channel 24. In the illustrated embodiments, each leaf spring 60 is attached to a respective sidewall 22 at a front connection point 62 and a back connection point 68. Alternatively, the leaf spring 60 may be attached to the sidewall 22 at only a single point. Each attachment may be fixed or may be a slidable attachment. Thus the leaf spring 60 may have one or two attachment points, and one, two or none of the attachment points may be slidable. The shown front and back connection points 62, 68 are at different locations along the sliding axis 30. In the illustrated embodiments, the connection points 62, 68 are in a line along the sliding axis. The connection points 62, 68 may also be along two different lines with respect to the sliding axis 30. For example, connection point 62, could be farther inside channel 24 and attached to a ledge (not shown) along sidewall 22.

The leaf spring 60 may have any of a variety of shapes, such as a band or wire. The leaf spring may be a single structure. The leaf spring 60 may be formed of metal, plastic or any material with elasticity. Leaf spring 60 is elongated and a path traced along leaf spring 60 is longer than the distance between connection points 62 and 68. Leaf spring 60 projects into channel 24 and inside path 34. An apex 65 of the leaf spring 60 is between a front curved section 64 extending from front connection point 62, and a back curved section 66 extending from back connection point to apex 65. Apex 65 is the furthest point of spring 60 within path 34.

When slide device 1 is in the open rest position 52, projection 46 and leaf springs 60 hold slide device 1 open. Back curved section 66 abuts projection 46. If bottom member 40 moves toward the closed position 54, tension in leaf spring 60 causes curved section 66 to push on projection 46 keeping it in the first position 42.

To place slide device 1 in the closed rest position 54, the user pushes bottom member 40 toward the closed position with enough force to overcome the tension in leaf spring 60. Once projection 46 passes apex 65, the front curved section 64 pushes on projection 46 until it is in the second position 44 and bottom member 40 is in the closed rest position 54.

The leaf spring 60 may be formed such that it is in constant tension and the tension is only magnified when projection 46 is in between the rest positions 42 and 44. Alternatively, leaf spring 60 may be relaxed when bottom member 40 is in either rest position and is only in tension when projection 46 is outside of one of the rest positions 42 and 44.

Connection points 62 and 68 may be fixed or they may be sliding or shifting. If the connection points 62 and 68 are fixed, leaf spring 60 may have natural tension driving leaf spring 60 toward either a flat position or a curved position. In either case, the passing of projection 46 over the apex 65 will increase tension. On the other hand, if connection points 62 and 68 are shifting, leaf spring 60 may normally be curved. As projection 46 pushes on curved side 64 or 66 the leaf spring 60 will flatten and spread at the connection points 62 and 68 with tension translated throughout leaf spring 60.

A second embodiment of the slide mechanism is shown in FIG. 3 with the slide device 1 shown in the open position 52. Leaf springs 160 include sharp bent sections 161 and 169 between apex 165 and front connection point 162, and between apex 165 and back connection point 168, respectively. Bent sections 161 and 169 project away from apex 165 and provide added flexibility to leaf spring 160. In the open rest position 52, the projection 46 is held in the first position by back curved section 166. Any slight movements toward the closed position 54 will be restricted by leaf spring 160. If the user forces the bottom member 40 into the closed position 54, leaf spring 160 will flex to allow projection 46 to pass over apex 165. As projection 46 pushes on back curved section 166, sharp bent sections 161 and 169 fold toward sidewall 22. Additionally, curved section 166 is flexed toward sidewall 22. As a result, apex 165 is pushed out of path 34 and projection 46 is moved toward the second position 44.

Although the preferred form of the invention has been shown and described, many features may be varied, as will readily be apparent to those skilled in this art. For example, the sliding mechanism may include leaf springs that are attached to the same side wall and project in the same direction. Further, the sliding mechanism may only include one leaf spring. Additionally, more than two connection points may be included in the leaf spring, such that there are more than two rest positions. It is the intention, therefore, to be limited only as indicated by the scope of the claims appended hereto.

I claim:

1. A sliding mechanism comprising:
a first member;
a second member slidably engaged with the first member and slidable along a first axis;
a guide mechanism disposed between the first member and the second member, the guide mechanism being operable to limit movement of the first member with respect to the second member in directions other than along the first axis;
a projection fixedly connected to the first member and slidable between first and second positions with respect to the second member; and
a resilient leaf spring attached to the second member, the leaf spring in sliding engagement with the projection, the leaf spring being operable to restrain the projection in the first position or the second position.

2. The sliding mechanism according to claim 1 wherein the projection is slidable along a path and the first position is at one end of the path and the second position is at another end of the path.

3. The sliding mechanism according to claim 2 wherein one end of the leaf spring is attached to the second member at a first connection point and another end of the leaf spring is attached to the second member at a second connection point.

4. The sliding mechanism according to claim 3 wherein each of the first connection point and the second connection point are fixed, wherein the leaf spring includes:
an apex projecting along a direction orthogonal to a direction along the first and second connection points, and
a curved section between the apex and each of the first and second connection points, and
wherein each curved section is operable to engage the projection, thereby maintaining the projection in one of the first position and second position.

5. The sliding mechanism according to claim 4 wherein the leaf spring further comprises a bent section between each curved section and an adjacent one of the first and second connection points.

6. The sliding mechanism according to claim 3 wherein at least one of the first connection point and the second connection point is slideable, and wherein the leaf spring is normally curved.

7. The sliding mechanism according to claim 6 wherein the projection is operable to flatten the leaf spring as the projection slides along the path.

8. The sliding mechanism according to claim 2 further comprising: a second leaf spring attached to the second member, and wherein each leaf spring includes an apex and each leaf spring is attached to the second member at a respective connection point, and wherein the apexes are disposed closer to one another than the connection points.

9. The sliding mechanism according to claim 2 further comprising a second leaf spring attached to the second member, and wherein each leaf spring is attached to the second member at a respective connection point, and wherein each leaf spring includes an apex projecting toward the other of the leaf springs.

10. A portable device comprising:
a bottom member;
a top member slidably engaged with the bottom member and slidable along a first axis;
a guide mechanism disposed between the bottom member and the top member operable to limit movement of the top member with respect to the bottom member in directions orthogonal to the first axis;
a resilient leaf spring attached to the top member at a connection point, the leaf spring defining a second axis passing through the connection point and an end of the leaf spring that is opposite the connection point, the leaf spring having an apex located at a first distance from the second axis; and
a projection fixedly connected to the bottom member that contacts the leaf spring at a contact point, the contact point being disposed at a distance from the second axis that is less than the first distance,
wherein the projection is slidable between a first position and a second position, the leaf spring is in sliding engagement with said projection and operable to retain the projection in one of the first position and the second position, and the projection is operable to deform the leaf spring as it moves from the first position to the second position.

11. The portable device according to claim 10, wherein the bottom member includes a display element on a side opposite the top member.

12. The portable device according to claim 10, wherein the top member includes a display element on a side opposite the bottom member.

13. The portable device according to claim 10, wherein the leaf spring is attached to the top member by at least one slidable connection point, and wherein the projection flattens the leaf spring as it deforms the leaf spring.

14. A portable device comprising:
a top member;
a bottom member slidably engaged with the top member and slidable along a first axis between an open position where the top and bottom members do not completely overlap and a closed position where the top and bottom members completely overlap;
a guide mechanism disposed between the first member and the second member, the guide mechanism being operable to limit movement of the first member with respect to the second member in directions other than along the first axis;
a projection fixedly connected to the first member and slidable with respect to the second member through a path, the path including a first position at one end corresponding to the open position and a second position at another end corresponding to the closed position; and
a resilient leaf spring attached to the second member and in sliding engagement with the projection, the leaf spring being operable to restrain the projection in the first position or the second position.

15. The portable device according to claim 14 further comprising a display element on a side of the top member that is opposite the bottom member.

16. The portable electronic device according to claim 15 further comprising a keypad on the bottom member that is hidden when the bottom member is in the closed position.

17. The portable electronic device according to claim 14 further comprising a screen on a side of the bottom member that is opposite the top member.

18. The portable electronic device according to claim 17 further comprising a keypad on the top member that is hidden when the bottom member is in the closed position.

* * * * *

UNITED STATES PATENT AND TRADEMARK OFFICE
CERTIFICATE OF CORRECTION

PATENT NO.         : 7,853,300 B2                                Page 1 of 1
APPLICATION NO.    : 11/750765
DATED              : December 14, 2010
INVENTOR(S)        : Jack Seidler It is certified that error appears in the above-identified patent and that said Letters Patent is hereby corrected as shown below:

Column 3, line 36, "In" insert new paragraph;

Column 4, line 20, "point to" should read --point 68 to--; and

Column 4, line 58, "position" should read --position 42--.

Signed and Sealed this
Eleventh Day of October, 2011

David J. Kappos
*Director of the United States Patent and Trademark Office*